United States Patent [19]
Horie et al.

[11] Patent Number: 5,583,385
[45] Date of Patent: Dec. 10, 1996

[54] POWER CONVERTING DEVICE FOR REDUCING AN INDUCTION PROBLEM

[75] Inventors: Akira Horie; Syuuji Saitou, both of Katsuta; Takayuki Matui, Hitachi; Ken Itoh, Minori-machi; Takashi Tsuboi; Eiichi Toyota, both of Katsuta, all of Japan

[73] Assignee: Hitachi, Ltd., Tokyo, Japan

[21] Appl. No.: 260,473

[22] Filed: Jun. 14, 1994

[30] Foreign Application Priority Data

Jun. 22, 1993 [JP] Japan ................................. 5-150100

[51] Int. Cl.⁶ ..................................... H02M 7/00
[52] U.S. Cl. ............................................. 307/151; 307/82
[58] Field of Search ..................... 307/82, 151; 363/141, 363/14; 318/139

[56] References Cited

U.S. PATENT DOCUMENTS 4,347,854  9/1982  Gosline et al. ........................ 128/736
5,341,075  8/1994  Cocconi ................................. 318/139

FOREIGN PATENT DOCUMENTS 0371427  6/1990  European Pat. Off. .
0577099  1/1994  European Pat. Off. .
0590502  4/1994  European Pat. Off. .
2624567  1/1977  Germany .

Primary Examiner—William M. Shoop, Jr.
Assistant Examiner—Marlon T. Fletcher
Attorney, Agent, or Firm—Antonelli, Terry, Stout & Kraus

[57] ABSTRACT

In order to reduce an induction problem, which might otherwise be caused by a higher-harmonic current leaking to the outside of an inverter device, with a simple construction, an inverter device casing and a heat receiving plate mounted thereon are insulated from each other, and the heat receiving plate and a filter capacitor in the power supply circuit are connected through a predetermined inductance. Since the higher harmonics current is bypassed to the filter capacitor through the resonance filter which is formed by of the electrostatic capacity in a switching element and the inductance, the induction problem can be reduced by simple construction.

5 Claims, 6 Drawing Sheets

POWER CONVERTING DEVICE FOR REDUCING AN INDUCTION PROBLEM

BACKGROUND OF THE INVENTION

The present invention relates in general to a power converting device and, more particularly, to a power converting device of the type which supplies power to an electric car, such as a railroad car or the like.

In prior power converting devices, there has been a problem that a higher harmonic component issued from an inverter to an induction motor of an electric car flows over the body of the electric car through a stray capacity between the armature winding of the induction motor and the motor frame to exert an adverse effect, leading to a malfunction of a signal device on the ground. In the technique, as disclosed in Japanese Patent Laid-Open No. 193001/1992, the power line of an electric motor, through which the higher harmonic current will flow, is accommodated in a conductive duct so as to prevent the higher harmonic current from flowing to the car body, whereby the magnetic flux may be eliminated by connecting the motor frame electrically with the conductive duct and by using this duct as a feedback passage for the higher harmonic current.

In the prior technique described above, however, leakage of the higher harmonic current to the car body cannot be decreased to a sufficient extent.

This is because the electric motor or a heavy component having a weight of several hundreds Kg is mounted on the truck of the electric car by means of bolts or the like so that the higher harmonic current will leak to the car body through those bolts and the truck.

Thus, the higher harmonic current flowing through the car body has caused a problem in that a signal device on the ground or on the car is adversely affected by this higher harmonic component.

SUMMARY OF THE INVENTION

The present invention has been conceived in view of the above-specified problems and has an object to reduce the adverse influence due to a higher harmonic current generated by a power converter, with a simple construction.

In order to achieve the aforementioned object, the present invention is based upon the concept that the higher harmonic current should not be allowed to flow to the outside of an inverter, but should be processed in the device. In a power converting device having a construction comprising a switching element and cooling means mounted on the device through an insulator, therefore, the cooling means and the ground side of a power source for the switching element are connected with each other.

Noting that the switching element forming the power converting device has an electrostatic capacity therein and that the higher harmonic current flows into the cooling means through the electrostatic capacity, the higher harmonic current, which might otherwise flow into the power line of an electric motor, is bypassed to the ground side of the power source by connecting the cooling means and the ground side of the power source electrically.

As a result, it is possible to reduce the higher harmonic current which might otherwise leak to the outside of the inverter device.

DETAILED DESCRIPTION OF THE PREFERRED EMBODIMENTS

Figure 1:
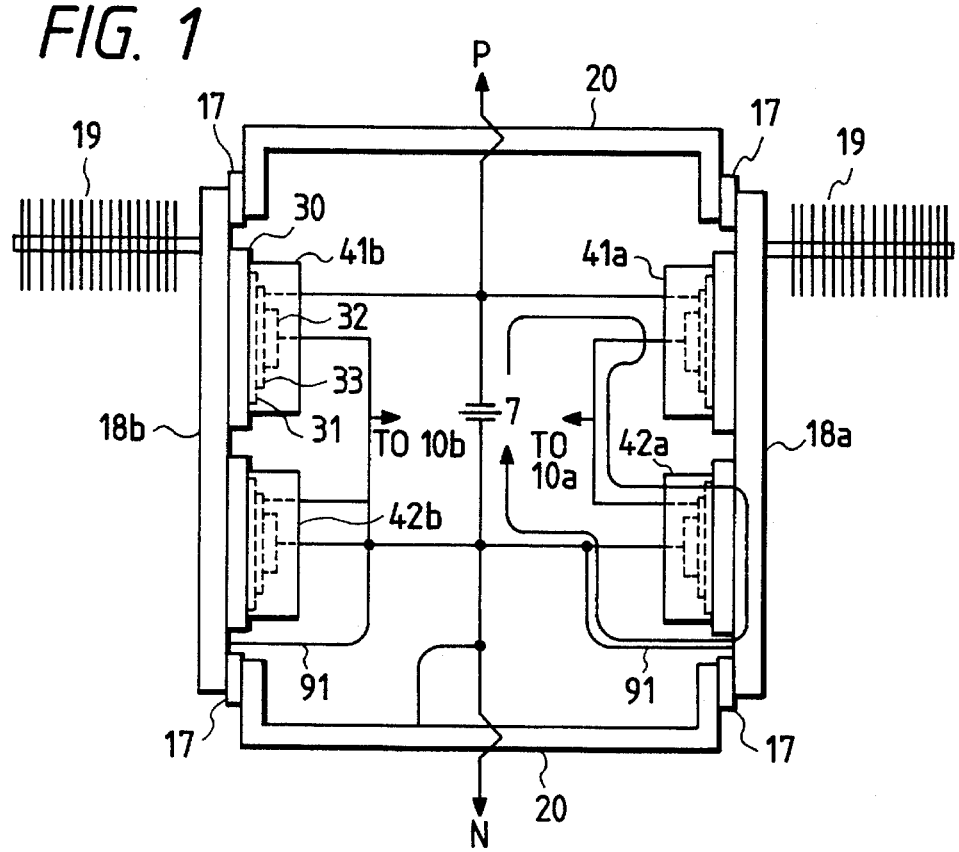
FIG. 1 is a diagram for explaining one embodiment of the present invention.

The present invention will be described with reference to FIG. 10 in connection with one embodiment in which an inverter device in accordance with the invention is applied to an electric car, such as a railroad car or the like.

An inverter device 20 mounted below the floor of an electric car 22 is supplied with DC electric power from an aerial cable 1 via a pantograph 2 via a plus line P to convert it into a three-phase alternating current having variable voltage and frequency, thereby to energize induction motors 10a and 10b for driving the electric car.

On the other hand, the return current from the inverter device 20 is returned via ground to the not-shown substation via a minus line N, a mounted brush 23 in sliding contact with the axle 24 of a truck 25, and the rail on which the car travels.

Moreover, the inverter device 20 is arranged at the two sides of its casing with a-line and b-line power units of U-, V- and W-phases for driving the a-line and b- line induction motors 10a and 10b.

Here will be described one example of the main circuit construction of this inverter device with reference to FIGS. 7 and 8.

Figure 7:
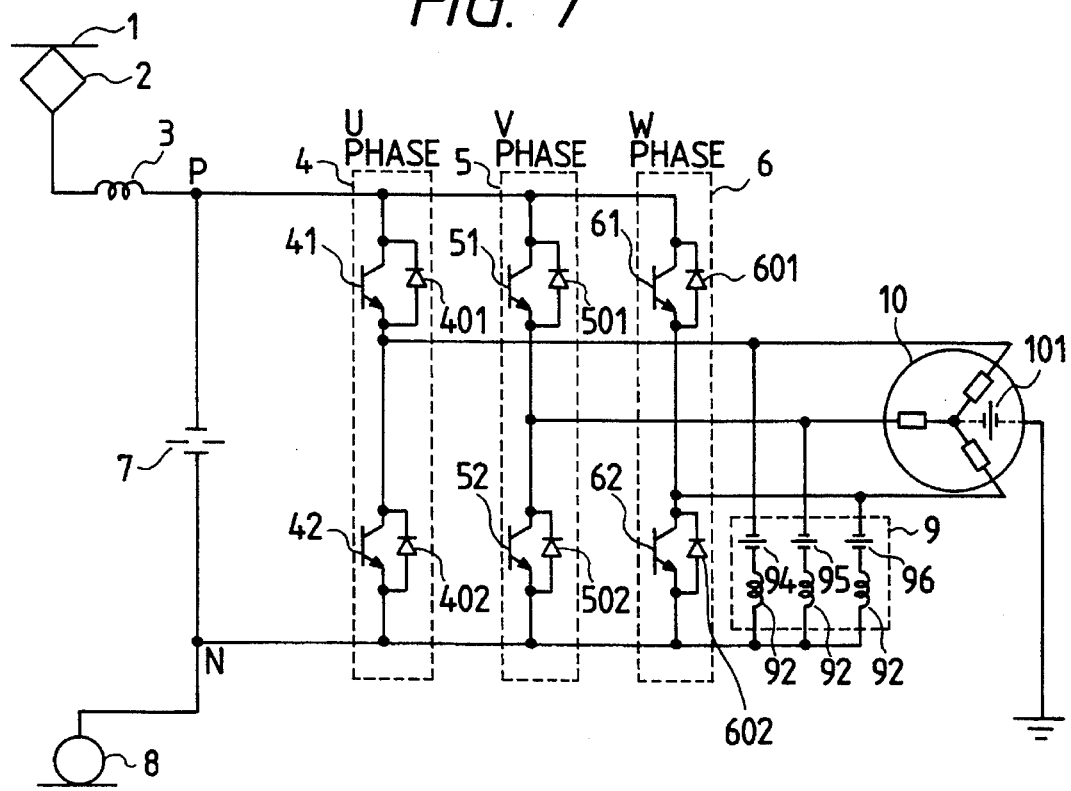
FIG. 7 is a diagram showing a main circuit of a two-level inverter.

In FIG. 7, the DC current is supplied from the aerial cable 1 to individual phase arms 4, 5 and 6 through the pantograph 2 and a filter circuit composed of a filter reactor 3 and a filter capacitor 7, so that it is converted into a two-level phase voltage by turning ON and OFF switching elements of individual phases selectively to drive the induction motor 10 rotationally.

The switching elements to be used herein are exemplified by self-extinguishing type switching elements, such as gate turn off thyristors (i.e., GTO thyristors), bipolar transistors or insulated gate bipolar transistors (i.e., IGBT).

In recent years, on the other hand, a three-level inverter has been used as the inverter for the electric car. This inverter can output plus, zero and minus voltages as the output phase voltages so that the apparent switching frequency can be increased to output an alternating current more closely resembling a sinusoidal wave. This will be described with reference to FIG. 8.

Voltage dividing capacitors 71 and 72 divide the input direct current at a division ratio (of 1:1), and the plus, zero and minus voltages are outputted as phase voltage by the switching actions of the four individual phase arms connected in series.

The description will be further made by taking the U-phase arm 4 as an example.

While switching elements 43 and 44 of the IGBT or the like are ON, the potential of point P is outputted to the induction motor 10. While switching elements 44 and 45 are ON, the neutral potential of point 0 is outputted. While switching elements 45 and 46 are ON, the potential of point N is outputted.

As those elements are selectively turned ON and OFF, an alternating current subjected to a pulse-width modulation is outputted.

Although the inverter device 20 satisfactorily performs the switching actions described above, an induction problem is caused by the electric current having higher harmonics, which is outputted from the inverter.

This will be described with reference to FIG. 7.

The higher harmonic current outputted from the inverter flows via the armature winding of the induction motor 10, a stray capacity 101 residing in the frame of the motor, and ground until it is fed back to the minus side of the inverter device 20.

Figure 10:
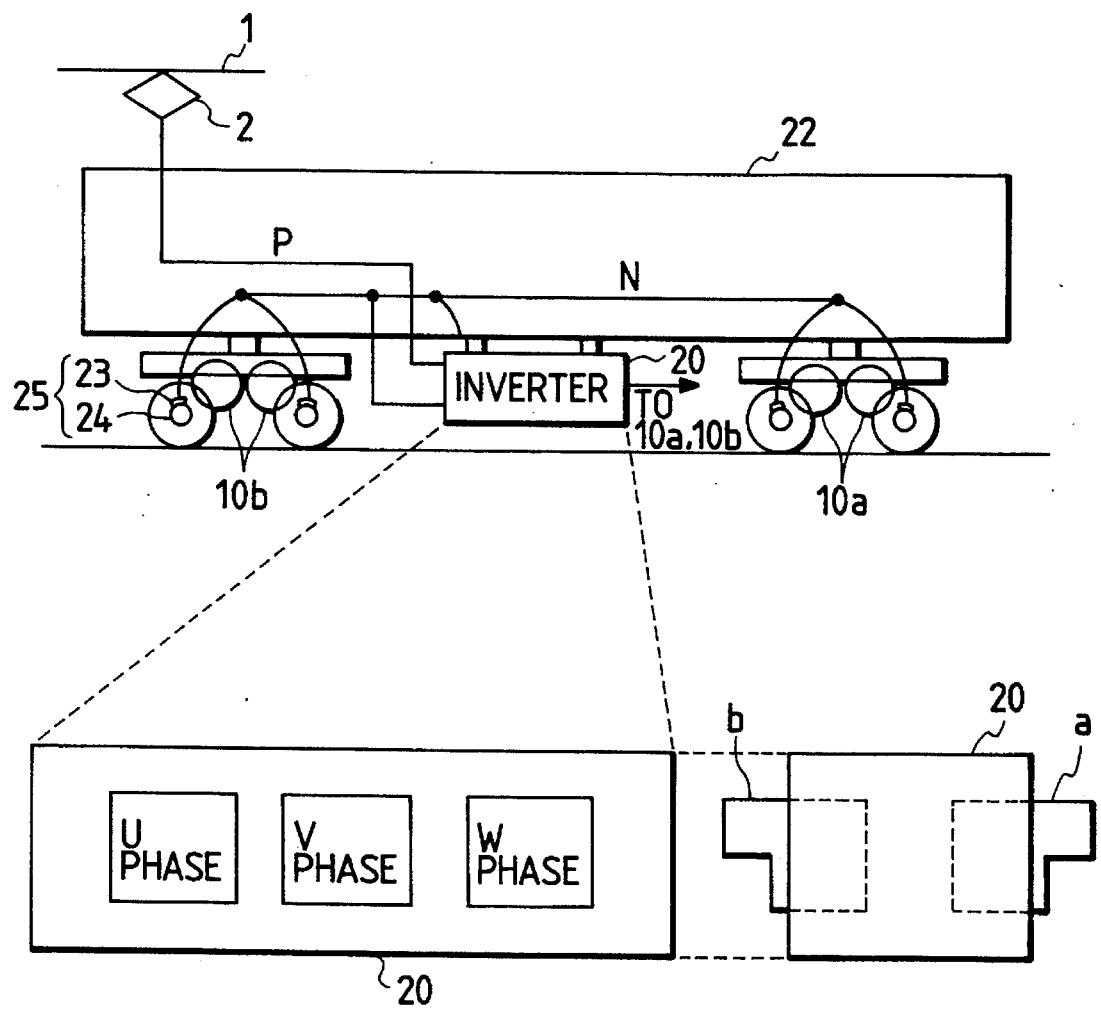
FIG. 10 is a diagram showing an arrangement of the devices on an electric car.

As also shown in FIG. 10, the inverter device 20 and the induction motor are distant from each other and are connected with each other through a conductor. Thus, if the higher harmonic current flows through the conductor, this conductor functions as an antenna to exert adverse affects of noise upon the signal system of a railway which functions on the basis of inductive or wireless operations.

Figure 9:
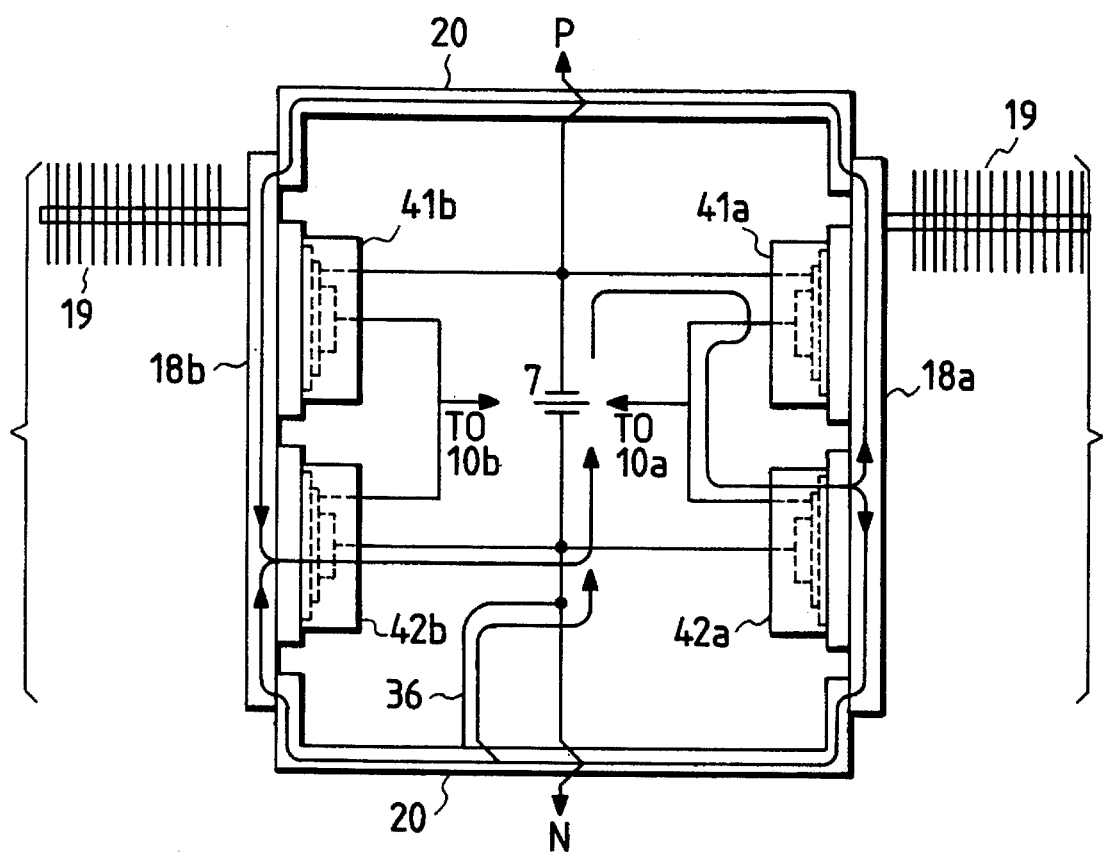
FIG. 9 is a diagram for explaining the path of a higher-harmonic current flowing over a casing of an inverter.

This induction problem also occurs in another line. This will be described with reference to FIG. 9. FIG. 9 is a section showing the inside of the inverter device 20 shown in FIG. 10. The inverter device 20 is composed of the two two-level inverters of FIG. 7. Of these, the righthand inverter drives the a-line electric motor 10a, and the lefthand inverter drives the b-line electric motor 10b. Only one phase is shown in FIG. 9. Similar discussions apply to the remaining phases.

Heat receiving plates (or heat blocks) 18a and 18b for absorbing the heat generated by the switching elements are mounted on the two sides of the casing 20 of the inverter unit by means of not-shown bolts. To these heat receiving plates 18a and 18b, there are individually attached radiators 19 for radiating the heat absorbed by those heat receiving plates to the atmosphere.

To the heat receiving plates 18a and 18b, moreover, semiconductor devices 41a and 42a, 41b and 42b acting as the switching elements are fixedly attached and packaged by means of bolts or the like.

Figure 6:
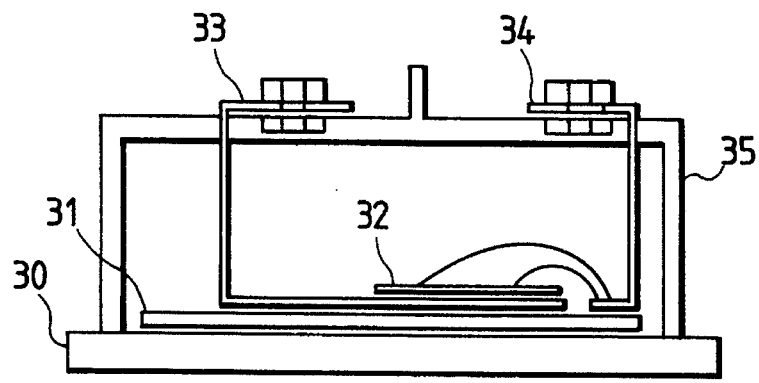
FIG. 6 is a diagram showing an internal structure of a switching element to be used in the present invention.

Here will be described one example of the internal structure of the semiconductor device with reference to FIG. 6.

The semiconductor device is composed of a semiconductor chip 32, a plus electrode 33 connected with a collector plate, a minus electrode 34, an insulating plate 31 and a copper base 30, and these components are junctioned with each other by means of solder. Moreover, this semiconductor device has its outer side covered with an insulating package 35 of plastics or the like to provide a module type device. Although not shown, the present invention can also be applied even to a module having its free wheel diode packaged.

The insulating plate 31 has a role to insulate the copper base 30 and the semiconductor chip 32 electrically and to transmit the thermal loss caused in the semiconductor chip 32 to the copper base 30.

On the other hand, the insulating plate 31 to be used is made mainly of alumina ($Al_2O_3$) or aluminum nitride (AlN).

An electrostatic capacity is established between the collector plate connected with the plus electrode 33 and the copper base 30 because the insulating plate 31 acts as a dielectric element.

When the switching elements are turned ON/OFF, the main circuit current is blocked by the insulating plate 31, but a high-frequency current may be induced in the casing through the electrostatic capacity.

In FIG. 9, for example, the switching element 41b is OFF, but the switching element 42b is ON. At the instant when the switching element 41a is switched ON from OFF and the switching element 42a is switched OFF from ON, the switching element 42a is turned OFF and the switching element 41a is turned ON. At this instant, the voltage of the filter capacitor 7 functioning as a power source is applied to the collector plate of the switching element 42a. Then, the charge current to be determined by the dielectric constant or the like of the insulating plate 31 of the switching element 42a begins flowing from the collector to the copper base 30. The leakage current thus flowing out is returned from the heat receiving plate 18a through the casing 20 and via the electrostatic capacity of the insulating plate 31 of the ON switching element 42b to the filter capacitor 7. Incidentally, in order to prevent an electric shock, the casing 20 is connected by a casing grounding line 36 to the minus (or ground) line N, through which a portion of the leakage current returns to the filter capacitor 7.

Although one phase of the a-line and b-line has been described, this description per se likewise applies to the remaining phases, and so current flows as a stray current all over the surfaces of the casing. This leakage current contains various frequency components which are determined by the switching rates of the switching elements, the electrostatic capacity of the insulator, the stray inductance of the main circuit and the impedance of the casing.

Our experiences have revealed that a high-frequency current as high as several hundreds KHz or more might flow in several tens A per phase.

This high-frequency leakage current flowing through that casing also causes a noise problem which will affect the communication system for a railroad, such as an induction wireless communication system, which is laid in the vicinity of the rail.

Here will be described an embodiment which eliminates either or both of the two kinds of higher harmonic currents (e.g., the current together with the main circuit current to the minus side, and the stray current on the casing surface) thus far described.

FIG. 1 shows one embodiment of the present invention.

The description to be made is limited to the points which are different from those of the construction shown in FIG. 9.

The heat receiving plates 18a and 18b are attached to the casing 20 of the inverter device through sufficiently thick insulators 17 of rubber. Moreover, these heat receiving plates 18a and 18b constituting a cooling arrangement are connected directly to the minus line of the main circuit.

Thanks to this construction, the higher harmonic current, which might otherwise flow to the induction motor 10, is bypassed by the electrostatic capacities of the individual switching elements 41a, 42a, 41b and 42b and a conducting line (or conductor) 91 to return directly to the filter capacitor 7 so that it will not leak to the outside of the inverter device 20. As a result, the higher harmonic current which is caused to flow through the conductor connecting the inverter device 20 and the induction motor 10 can be reduced so that the conductor plays the role of an antenna to reduce the induction problem.

Moreover, the cooling arrangement and the casing are insulated with a sufficiently high impedance against high-frequency waves, and the cooling arrangement and the minus line are connected through the conductor having a sufficiently low impedance against high-frequency waves. As a result, the leakage current, which is generated as the collector potential of the switching element 42a changes, is blocked by the insulator 17, to prevent it from turning into a stray current flowing in the casing of the inverter device 20, and is bypassed directly to the minus side of the filter capacitor.

As a result, no current will flow into the casing of the inverter device 20.

Here will be described another embodiment of the present invention with reference to FIG. 2.

Figure 2:
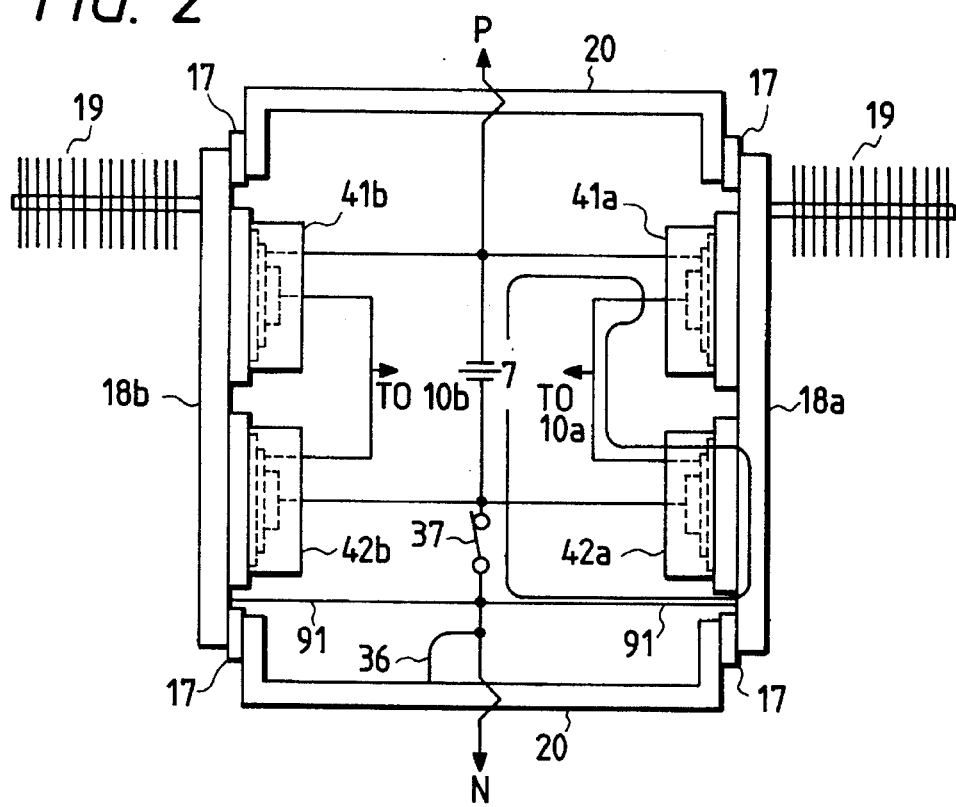
FIG. 2 is a diagram for explaining another embodiment of the present invention.

FIG. 2 is different from the embodiment shown in FIG. 1 in the provision of a grounding switch 37 in the N line to the casing and in the connection between the ground side of the grounding switch 37 and the heat receiving plates 18a and 18b through the conductor 91. The grounding switch 37 is used to test the insulation between the charging portion of the main circuit and the casing. A predetermined voltage is applied at the time of an insulation test between the charging portion of the main circuit and the casing by opening that grounding switch 37. Since, at this time, the conductor 91 from the heat receiving plates 18a and 18b is isolated from the main circuit charging portion by the grounding switch 37, no trouble arises in the insulation test between the charging portion of the main circuit and the casing.

In the embodiments thus far described, what is done is to connect the heat receiving plates and the minus side of the filter capacitor merely through the conductor 91. However, here will be described one embodiment in which a specific frequency component in the passage leading to the induction motor to be filtered out is reduced by making positive use of the electrostatic capacity in the switching elements.

The capacity of the insulating plate 31 will be calculated again with reference to FIG. 6.

A specific dielectric constant $\epsilon_r$ of the alumina forming the insulating plate is expressed by:

$\epsilon_r = 8.5;$ and $\tan\delta = 5 \text{ to } 20 \times 10^{-4}.$

If the insulating alumina plate has a thickness t of 0.5 mm, a length A of 100 mm and a width B of 100 mm, the capacity can be determined from the following Equation.

$C = \epsilon_r {}_0 \times A \times B/t$ ($\epsilon_0$: Dielectric Constant in Vacuum =

$8.85 \times 10^{-15}$ F/mm) $= 1.5 \times 10^{-9}$ (F), wherein $\tan\delta$ takes a small value and has little internal loss so that it can be deemed as a capacitor).

Description will be detailed with reference to FIG. 3.

Figure 3:
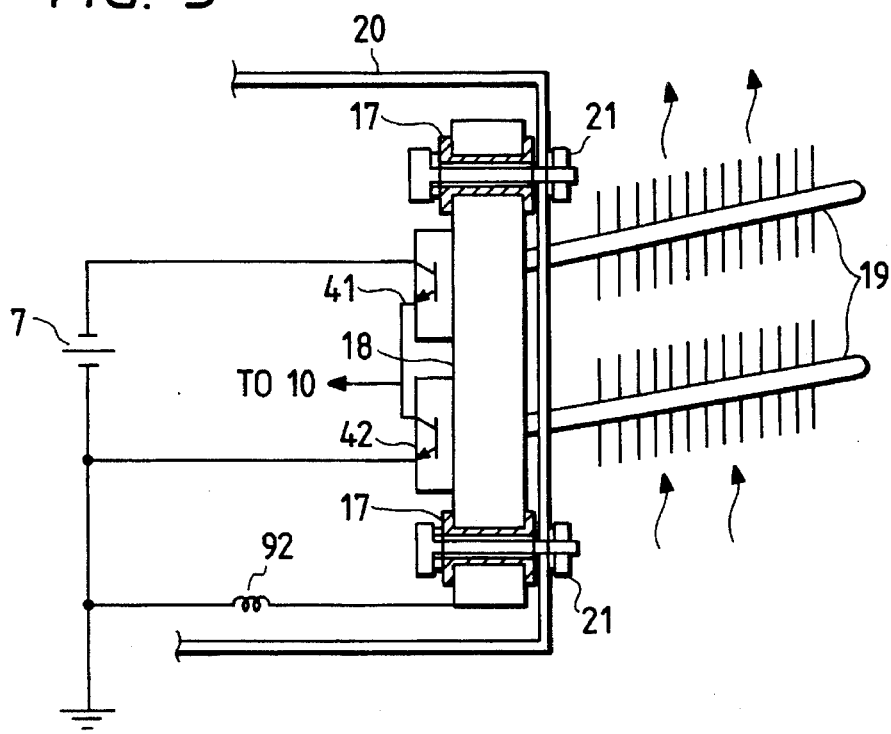
FIG. 3 is a diagram for explaining another embodiment of the present invention.

FIG. 3 is different from the embodiments shown in FIGS. 1 and 2 in that the present invention can be practiced even for one line, although the embodiments have two a-line and b-line inverters.

In other words, the former embodiments are intended to prevent the stray current which is generated because of the two lines. In the present embodiment, on the other hand, it is intended to reduce the higher harmonic current which will flow into at least the induction motor. Even in the case of two or more inverters, moreover, the present embodiment could naturally reduce the stray current.

The switching elements 41 and 42 are secured to a common heat receiving plate 18.

The heat receiving plate 18 is secured to the casing of the inverter device 20 through the insulators 17 by means of bolts 21. This insulator 17 prevents the higher harmonic current, which might otherwise flow through the electrostatic capacity in the switching elements, from flowing into the casing of the inverter device 20.

Now, in order to prevent the higher harmonic current to be generated by switching the switching elements from flowing into the conductor between the inverter device 20 and the induction motor 10, it is essential to bypass the higher harmonic current before the same reaches that conductor.

According to the present embodiment, the induction problem can be prevented with a simple construction by making positive use of the electrostatic capacity in the switching elements as a capacitor of an LC filter for bypassing the higher harmonic current.

Specifically, the inductance component to be connected between the heat receiving plate 18 and the filter capacitor 7 is calculated from the frequency of the higher harmonic current to be bypassed and the aforementioned electrostatic capacity, and an inductance component 92 having a magnitude thus determined is connected in the line between the heat receiving plate 18 and the filter capacitor 7. As a result, if the necessary inductance is as high as the wiring inductance, no reactor need be especially connected in the line. Thus, the embodiments of FIGS. 1 and 2 can be thought of as a special case of the present embodiment.

Here will be presented an example in which the frequency band to be used for the signal communications in the railway system is 200 KHz. In order to prevent interfering electric waves at this frequency from leaking to the outside of the electric car (i.e., the inverter device), the LC resonance frequency may be selected to be 200 KHz. This value is used to determine the inductance of the LC resonance filter because the frequency and the capacity are decided, as follows:

$L = 4.2 \times 10^{-4}$ (H), if $f = 1/(2\pi\sqrt{(LC)}) = 200$ KHz and $C = 1.5 \times 10^{-9}$ (F) are substituted.

The resonance filter of 200 KHz is obtained by setting a resonance inductance 92 to $4.2 \times 10^{-4}$ H.

Figure 4:
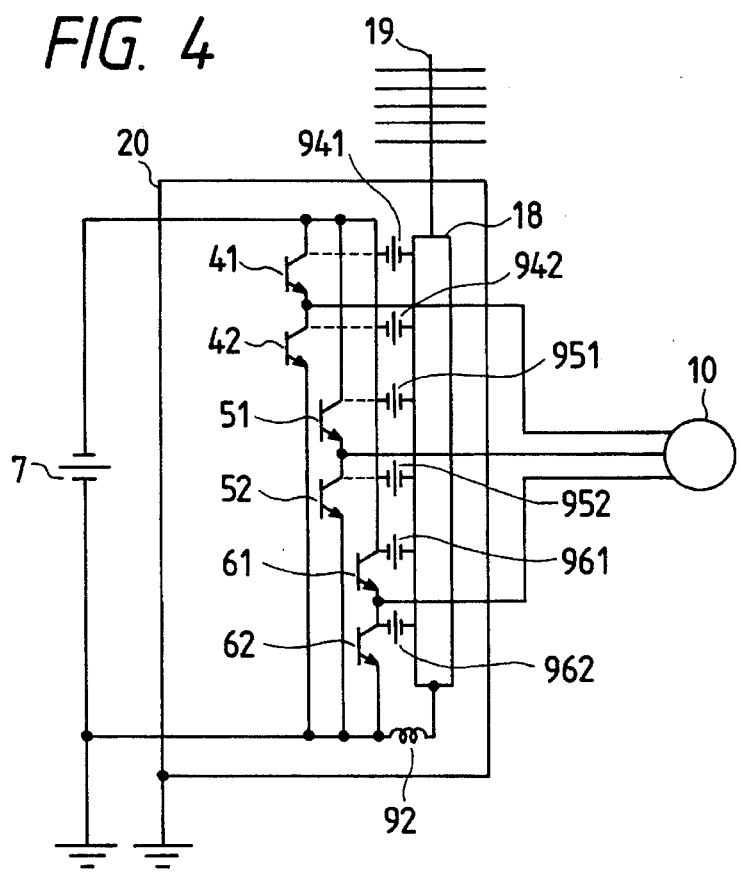
FIG. 4 is a diagram for explaining another embodiment of the present invention.

FIG. 4 is a schematic diagram showing the aforementioned embodiment as it relates to a three-phase inverter. The electrostatic capacities 941 to 962 of individual switching elements 41 to 62 are present between the collectors of the switching elements 41 to 62 and the heat receiving plate 18. Between the heat receiving plate 18 and the filter capacitor 7, moreover, there is connected the resonance inductance 92 which is calculated, as described above. This resonance inductance 92 is selected according to the magnitude of the inductance of an air-core reactor, an iron-core reactor, a mere winding or a mere line.

Here will be described an equivalent circuit with reference to FIG. 7.

Reference numerals 94 to 96 designate the electrostatic capacities of the individual switching elements for the individual phases, and numeral 92 designates the resonance inductance. These components constitute a bypass filter 9. Here, thanks to the presence of the bypass filter 9, the higher harmonic current will neither leak out of the inverter device nor leak to the conductor leading to the induction motor.

According to the present embodiment, the induction problem can be reduced with a simple construction.

Figure 5:
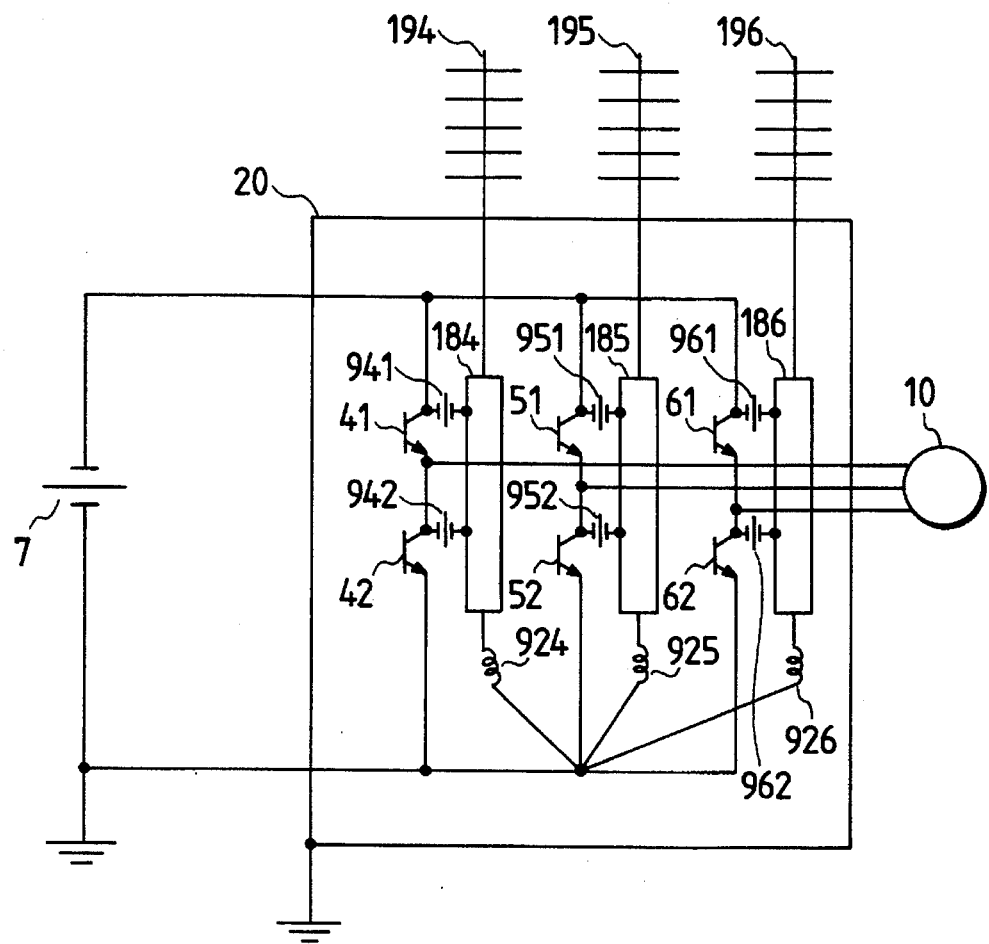
FIG. 5 is a diagram for explaining another embodiment of the present invention.

FIG. 5 shows another embodiment of the present invention.

Although the embodiment shown in FIG. 4 cools down the three phases altogether causing a single heat receiving plate 18, here is presented in FIG. 5 a case in which the three phases are separately cooled down.

Resonance inductances 924 to 926 in this case are respectively connected for the individual phases with the individual heat receiving plates and the minus side of the filter capacitor 7.

According to the present embodiment, the higher harmonic component of the LC resonance frequency is not transmitted to the induction motor 10 because it is bypassed by the filter circuit.

Although the foregoing description is directed to the case in which only one inverter is mounted in the casing of the inverter device 20, it is also possible even in the case in which a plurality of lines are mounted to suppress not only the higher harmonic current, which might otherwise flow to the induction motor 10, but also the stray current which might otherwise flow over the casing surface.

Figure 8:
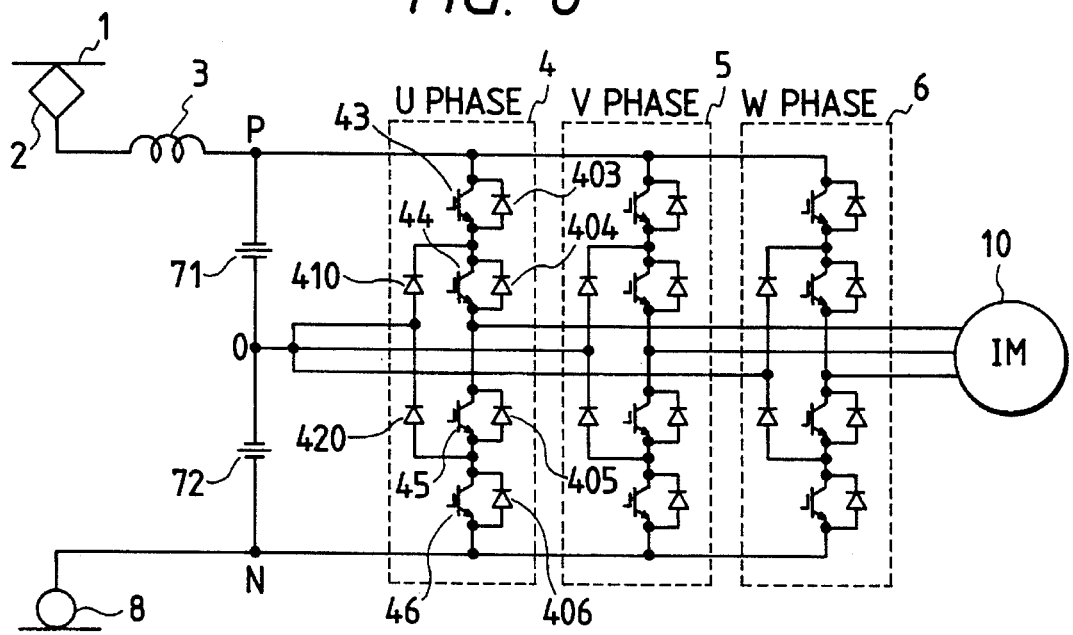
FIG. 8 is a diagram showing a main circuit of a three-level inverter.

Although the foregoing description is directed to two-level inverters, the present invention can achieve a higher effect if it is applied to a three-level inverter which has an apparently higher switching frequency, as shown in FIG. 8.

Moreover although the foregoing description is directed to inverters, similar effects can also be achieved even if the present invention is applied to a power converter, such as a PWM converter.

Although the foregoing description is directed to an electric car, the electric wave problem due to the higher harmonic waves between the power converter and the load, or due to the higher harmonic current passing over the casing, can be reduced by applying the present invention.

As has been described hereinbefore, according to the present invention, the induction problem due to the switching of the inverters can be reduced with simple construction.

We claim:

1. A power converting device for converting DC current into AC current, said power converting device comprising:

a pair of DC input terminals for receipt of DC current;

an inverter connected across said pair of DC input terminals and including a plurality of pairs of serially connected switching elements, for converting DC current received by said DC input terminals into AC current;

a pair of output terminals adapted for connection to a load and connected across serial connection points of said pairs of serially connected switching elements to permit connection of the load between said connection points;

a filter capacitor connected across said pair of DC input terminals;

an electrically insulating plate;

cooling means in thermal contact with said switching elements through said electrically insulating plate and electrically connected directly to one side of said filter capacitor;

a casing holding said switching elements; and an electrically insulating mounting member mounting said cooling means on said casing, while electrically isolating said cooling means from said casing, whereby electrical currents induced in said cooling means are blocked by said electrically insulating mounting member from going to said casing and instead are caused to go to said filter capacitor.

2. A power converting device as claimed in claim 1, further comprising a filter circuit electrically connecting said cooling means and a ground side of said switching elements, said filter circuit including a conductor having a predetermined inductance component.

3. A power converting device as claimed in claim 2, wherein said filter circuit includes a face of said switching elements in thermal contact with said cooling means and having an electrostatic capacity.

4. A power converting device, as claimed in claim 1, further comprising a grounding switch connected between said casing and said filter capacitor, and wherein said cooling means and the casing side of said grounding switch are connected with each other.

5. A power converting device as claimed in claim 1, wherein each said switching element has a plus electrode and a minus electrode and has an electrostatic capacity between its respective plus electrode and a predetermined face of such switching element, and wherein said power converting device further comprises a conductor directly connecting said predetermined face and the minus electrode of said switching element.

* * * * *